(12) United States Patent
Han et al.

(10) Patent No.: US 10,471,610 B2
(45) Date of Patent: Nov. 12, 2019

(54) ROBOT ARM HAVING WEIGHT COMPENSATION MECHANISM

(71) Applicants: SAMSUNG ELECTRONICS CO., LTD., Suwon-si, Gyeonggi-do (KR); Korea University Of Technology And Education Industry—University Cooperation Foundation, Cheonan-si, Chungcheongnam-do (KR)

(72) Inventors: Jeong Heon Han, Seoul (KR); Yong-Jae Kim, Cheonan-si (KR)

(73) Assignees: SAMSUNG ELECTRONICS CO., LTD., Suwon-si (KR); KOREA UNIVERSITY OF TECHNOLOGY EDUCATION INDUSTRY—UNIVERSITY COOPERATION FOUNDATION, Cheonan-si (KR)

( * ) Notice: Subject to any disclaimer, the term of this patent is extended or adjusted under 35 U.S.C. 154(b) by 921 days.

(21) Appl. No.: 14/995,801

(22) Filed: Jan. 14, 2016

(65) Prior Publication Data

US 2016/0368151 A1 Dec. 22, 2016

(30) Foreign Application Priority Data

Jun. 16, 2015 (KR) .................. 10-2015-0084936
Jun. 16, 2015 (KR) .................. 10-2015-0084938

(51) Int. Cl.
*B25J 19/00* (2006.01)

(52) U.S. Cl.
CPC .......... *B25J 19/0016* (2013.01); *Y10S 901/15* (2013.01); *Y10S 901/48* (2013.01)

(58) Field of Classification Search
CPC .... B25J 9/1045; B25J 1/1065; B25J 19/0016; B25J 9/1065
USPC .................. 248/123.11, 125.1, 125.2, 125.8; 267/168; 901/48; 74/490.01
See application file for complete search history.

(56) References Cited

U.S. PATENT DOCUMENTS

| 4,208,028 A * | 6/1980 | Brown .................. F16M 13/04 |
| | | 224/185 |
| 4,394,075 A * | 7/1983 | Brown ............... F16M 11/2014 |
| | | 224/185 |
| 5,360,196 A * | 11/1994 | DiGiulio ................ F16M 13/04 |
| | | 224/908 |
| 5,609,313 A * | 3/1997 | Cole ...................... B64D 29/00 |
| | | 244/54 |

(Continued)

FOREIGN PATENT DOCUMENTS

| KR | 10-1994-0006713 | 4/1994 |
| KR | 10-1999-0044591 | 6/1999 |

(Continued)

*Primary Examiner* — William C Joyce
(74) *Attorney, Agent, or Firm* — Staas & Halsey LLP

(57) ABSTRACT

A robot arm having a weight compensation mechanism. In one configuration, the robot arm includes a first link which is pivotably disposed, a first auxiliary link disposed parallel to the first link, a first pulley mounted on the first auxiliary link, a second pulley mounted on the first link, a wire connecting the first pulley to the second pulley, and an elastic member having one side mounted on the first link and the other side connected to the wire to provide an elastic force to compensate for the load of the first link.

21 Claims, 18 Drawing Sheets

(56) References Cited

U.S. PATENT DOCUMENTS

| | | | | |
|---|---|---|---|---|
| 6,564,667 | B2* | 5/2003 | Bayer | B25J 19/0016 267/291 |
| 8,985,537 | B2* | 3/2015 | Ishii | B25J 9/1065 248/278.1 |
| 9,689,451 | B2* | 6/2017 | Pepka | F16F 1/125 |
| 2010/0243344 | A1* | 9/2010 | Wyrobek | B25J 5/007 180/21 |
| 2013/0062476 | A1* | 3/2013 | Ishii | B25J 9/1065 248/70 |

FOREIGN PATENT DOCUMENTS

| | | |
|---|---|---|
| KR | 10-2000-0021209 | 4/2000 |
| KR | 10-2000-0031712 | 6/2000 |
| KR | 10-2001-0055176 | 7/2001 |
| KR | 10-2002-0001257 | 1/2002 |
| KR | 10-2002-0041757 | 6/2002 |
| KR | 10-2003-0034916 | 5/2003 |
| KR | 10-2004-0071244 | 8/2004 |
| KR | 10-2005-0048572 | 5/2005 |
| KR | 10-2005-0065828 | 6/2005 |
| KR | 10-2006-0100935 | 9/2006 |
| KR | 10-0658981 | 12/2006 |
| KR | 10-2007-0001829 | 1/2007 |
| KR | 10-2007-0019642 | 2/2007 |
| KR | 10-2007-0021184 | 2/2007 |
| KR | 10-2007-0031310 | 3/2007 |
| KR | 10-2007-0061147 | 6/2007 |
| KR | 10-2007-0068151 | 6/2007 |
| KR | 10-2007-0068153 | 6/2007 |
| KR | 10-2007-0092312 | 9/2007 |
| KR | 10-2007-0098559 | 10/2007 |
| KR | 10-2007-0107839 | 11/2007 |
| KR | 10-0783038 | 12/2007 |
| KR | 10-2009-0041432 | 4/2009 |
| KR | 10-0909041 | 7/2009 |
| KR | 10-2009-0114890 | 11/2009 |
| KR | 10-2010-0064654 | 6/2010 |
| KR | 10-2010-0085030 | 7/2010 |
| KR | 10-2010-0092929 | 8/2010 |
| KR | 10-2010-019004 | 10/2010 |
| KR | 10-2011-0017500 | 2/2011 |
| KR | 10-2011-0024834 | 3/2011 |
| KR | 10-2011-0080656 | 7/2011 |
| KR | 10-2011-0098734 | 9/2011 |
| KR | 10-2011-0123012 | 11/2011 |
| KR | 10-2011-0139344 | 12/2011 |
| KR | 10-2012-0000857 | 1/2012 |
| KR | 10-2012-0028837 | 3/2012 |
| KR | 10-2012-0060578 | 6/2012 |
| KR | 10-2012-0069923 | 6/2012 |
| KR | 10-2012-0071599 | 7/2012 |
| KR | 10-2012-0105355 | 9/2012 |
| KR | 10-2012-0115108 | 10/2012 |
| KR | 10-2012-0121278 | 11/2012 |
| KR | 10-2012-0121279 | 11/2012 |
| KR | 10-2012-0127888 | 11/2012 |
| KR | 10-2012-0128876 | 11/2012 |
| KR | 10-2012-0134036 | 12/2012 |
| KR | 10-2012-0137229 | 12/2012 |
| KR | 10-2013-0028542 | 3/2013 |
| KR | 10-2013-0029188 | 3/2013 |
| KR | 10-2013-0034082 | 4/2013 |
| KR | 10-2013-0084461 | 7/2013 |
| KR | 10-1371756 | 3/2014 |
| KR | 10-2014-0040479 | 4/2014 |
| KR | 10-1390219 | 4/2014 |
| KR | 10-1392706 | 5/2014 |
| KR | 10-2014-0106899 | 9/2014 |
| KR | 10-2014-0121572 | 10/2014 |
| KR | 10-2014-0134822 | 11/2014 |
| KR | 10-2014-0135291 | 11/2014 |
| KR | 10-1458002 | 11/2014 |
| KR | 10-1459325 | 11/2014 |
| KR | 10-1548179 | 8/2015 |

* cited by examiner (a)

(b)

ROBOT ARM HAVING WEIGHT COMPENSATION MECHANISM

CROSS-REFERENCE TO RELATED APPLICATION

This application claims the benefit of Korean Patent Application Nos. 10-2015-0084938 and 10-2015-0084936, each filed on Jun. 16, 2015 in the Korean Intellectual Property Office, the disclosure of each which is incorporated herein by reference.

BACKGROUND

1. Field

This disclosure relates to a robot arm having a weight compensation mechanism.

2. Description of the Related Art

A robot may be used to assist in work at an industrial site. The robot may include one or more arms pivotably disposed with respect to a joint. The one or more arms should be able to transport or support a heavy workpiece. The one or more arms may receive a torque due to the self-load or the load of a workpiece, and, as the magnitude of torque becomes greater, the size of a driving source such as a motor required to operate the one or more arms may become greater. If the size of the driving source becomes greater, it becomes difficult to realize a slim robot.

SUMMARY

According to one disclosed embodiment, there is provided a robot arm having a weight compensation mechanism capable of offsetting the load of the robot arm.

According to an embodiment, a robot arm having a weight compensation mechanism may include: a first link which is pivotably disposed; a first auxiliary link disposed parallel to the first link; a first pulley mounted on the first auxiliary link; a second pulley mounted on the first link; a wire connecting the first pulley to the second pulley; and an elastic member having one side mounted on the first link and the other side connected to the wire to provide an elastic force to compensate for the load of the first link.

Even if the first link is pivoted, the first auxiliary link may remain parallel to the first link.

The wire may have one end portion thereof fixed to the first pulley and the other end portion thereof passing along a portion of an outer surface of the second pulley and connected to the elastic member.

The length of the diameter of the first pulley may be equal to the length of the diameter of the second pulley.

As the first link is pivoted, a distance between the first pulley and the second pulley may vary.

The center of the second pulley may be positioned a predetermined interval apart from a center line extending along a direction in which the first link extends and passing through the center of the first link.

The elastic member may be accommodated in an inner space of the first link.

The center of the first pulley may be positioned on a center line extending along a direction in which the first auxiliary link extends and passes through the center of the first auxiliary link.

The robot arm having a weight compensation mechanism may include a second auxiliary link connecting the first link to the first auxiliary link.

The first link and the second auxiliary link may be apart from each other by as much as the length of the second auxiliary link and remain parallel to each other even if the first link is pivoted.

The second auxiliary link may be pivotably disposed with respect to respective axes of rotations of the first link and the first auxiliary link.

The elastic member may be provided by overlapping a plurality of elastic members.

The plurality of elastic members may be fixed by a cap mounted on an end portion thereof.

A screw thread may be formed at an inner surface of the cap, and the plurality of elastic members may be fixed by the screw thread.

An accommodation unit into which the plurality of elastic members are insertable may be formed at the cap, and the number of the accommodation units may correspond to the number of the plurality of elastic members.

A screw thread capable of fixing the elastic member may be formed at an inner surface of the cap forming the accommodation unit.

An adjustment device for adjusting the tension of the elastic member may be disposed at the cap.

The adjustment device may be a shaft having a screw thread formed at an outer circumferential surface thereof and passing through the cap.

The tension of the elastic member may be adjusted by rotating the shaft.

According to an embodiment, a robot arm having a weight compensation mechanism may be a robot arm that has a weight compensation mechanism which compensates for a load of a link by an elastic force of an elastic member, wherein the robot arm may include a first link and a second link that remain parallel to each other, and the weight compensation mechanism may include a first pulley mounted on the first link; a second pulley disposed to have the same diameter as the first pulley and mounted on the second link; a wire connecting the first pulley to the second pulley; and an elastic member disposed along a direction in which the first link extends, and having one side fixed to the first link and the other side connected to the wire.

According to an embodiment, a robot arm having a weight compensation mechanism may include a first link; a second link pivotably connected to the first link through a first joint; a first auxiliary link disposed a predetermined interval apart from the first link; a first pulley disposed at the first auxiliary link; a second pulley disposed at a joint; a third pulley mounted on the second link to move together with the second link; a wire connecting the first pulley, the second pulley, and the third pulley; and an elastic member having one side mounted on the first auxiliary link and the other side connected to the wire to provide an elastic force to compensate for the load of the second link.

The wire may be disposed to surround outer portions of the first pulley, the second pulley, and the third pulley.

One end portion of the wire may be fixed to the first pulley, and the other end portion of the wire may be connected to the elastic member after passing along the first pulley, the second pulley, and the third pulley.

The diameter of the first pulley, the diameter of the second pulley, and the diameter of the third pulley may be the same size.

The center of the third pulley may be positioned a predetermined interval apart from a center line which extends along a direction in which the second link extends and passes through the center of the second link.

As the second link is pivoted with respect to the joint, a distance between the center of the first pulley and the center of the third pulley may vary.

Even if the second link is pivoted with respect to the joint, a distance between the center of the second pulley and the center of the third pulley may remain constant.

When the second link rotates clockwise or counterclockwise with respect to the joint, the third pulley may rotate clockwise or counterclockwise with respect to the second pulley.

An accommodation unit in which the elastic member may be accommodated may be formed at the first auxiliary link.

The robot arm having a weight compensation mechanism may further include a second auxiliary link connecting the first auxiliary link to the joint.

The first auxiliary link and the first link may be disposed parallel to each other.

The elastic member may be provided by overlapping a plurality of elastic members.

The plurality of elastic members may be fixed by a cap mounted on an end portion thereof.

A screw thread may be formed at an inner surface of the cap, and the plurality of elastic members may be fixed by the screw thread.

An accommodation unit into which the plurality of elastic members are insertable may be formed at the cap, and the number of accommodation units may correspond to the number of the plurality of elastic members.

A screw thread capable of fixing the elastic member may be formed at an inner surface of the cap forming the accommodation unit.

An adjustment device for adjusting tension of the elastic member may be disposed at the cap.

The adjustment device may be a shaft having a screw thread formed at an outer circumferential surface thereof and passing through the cap.

The tension of the elastic member may be adjusted by rotating the shaft.

According to an embodiment, a robot arm having a weight compensation mechanism may be a robot arm that has a weight compensation mechanism which compensates for a load of a link by an elastic force of an elastic member, wherein the robot arm may include: a first link and a first auxiliary link disposed parallel to each other; a second link pivotably connected to the first link; a first pulley disposed at the first auxiliary link; a second pulley disposed to have the same diameter as the first pulley and mounted on a joint to which the first link and the second link are connected; a third pulley disposed to have the same diameter as the first pulley, and mounted on the second link to move together with the second link; a wire surrounding the first pulley, the second pulley, and the third pulley; and an elastic member disposed along a direction in which the first auxiliary link extends, and having one side fixed to the first auxiliary link and the other side connected to the wire.

BRIEF DESCRIPTION OF THE DRAWINGS

These and/or other aspects of the disclosure will become apparent and more readily appreciated from the following description of the embodiments, taken in conjunction with the accompanying drawings of which.

DESCRIPTION OF EMBODIMENTS

Hereinafter, a robot arm having a weight compensation mechanism according to an embodiment of the present disclosure will be described in detail with reference to the accompanying drawings.

Figure 1:
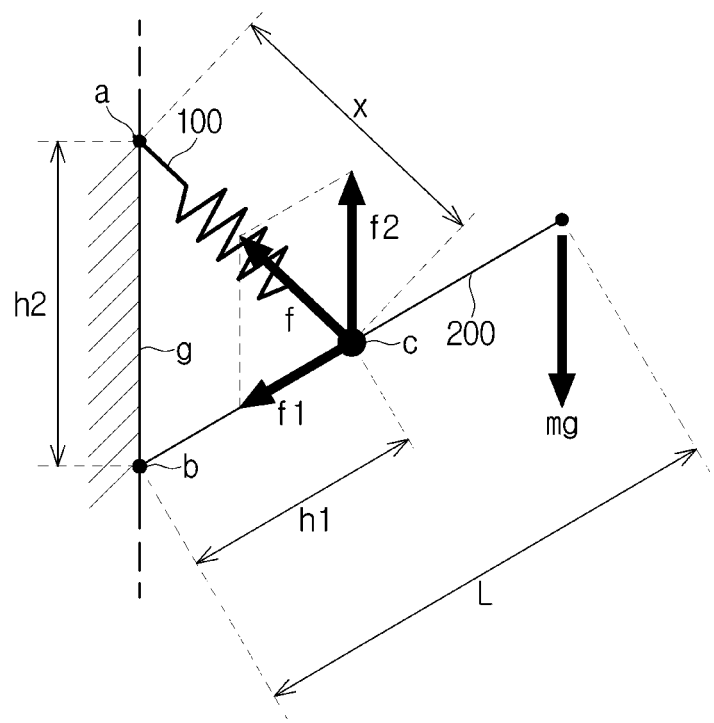
FIG. 1 is a view for describing a principle of a weight compensation mechanism according to an embodiment.

FIG. 1 is a view for describing a principle of a weight compensation mechanism according to an embodiment.

Referring to FIG. 1, one end portion of an elastic member 100 may be fixed to a point a of a reference surface g, and a link 200 may be fixed to a point b of the reference surface g. The other end portion of the elastic member 100 may be fixed to a fixed portion c of the link 200. A weight mg of the link 200 may be offset by an elastic force f of the elastic member 100 having a proper elastic coefficient k, such that a torque caused by the weight mg of the link 200 may be 0 at the point b at which the link 200 is fixed.

Hereinafter, a distance between the point a at which the elastic member 100 is fixed and the point b at which the link 200 is fixed may be called "h2", and a distance from the point b to the fixed portion c of the link 200 to which the elastic member 100 is coupled may be called "h1". A distance from the point b to the weight mg of the link 200 may be called "L". An angle between the elastic member 100 and the reference surface g at which the points a and b are positioned may be called θ.

At the fixed portion c, the elastic force f of the elastic member 100 may be decomposed into f1 in accordance with a longitudinal direction of the link 200 and f2 which is parallel to and formed in the opposite direction of the weight mg of the link 200. The f1 component is a force acting in the longitudinal direction of the link 200, and does not generate a torque at the point b. However, at the point b, the f2 component generates a torque as much as the magnitude of f2h1 cos θ.

The magnitude of the torque caused by the weight mg of the link 200 is mgL cos θ. When the magnitude of the torque caused by the f component of the elastic member 100 and the magnitude of the torque caused by the weight mg of the link 200 are the same, i.e. when $$mgL \cos \theta = f2h1 \cos \theta \quad \text{(Equation 1)}$$

is satisfied, the weight mg of the link 200 may be offset by the elastic member 100. Meanwhile, $$f2 = fh2/x \quad \text{(Equation 2)}$$

may be derived from a triangle formed by the points a, b, and fixed portion c in FIG. 1. When an elastic coefficient of the elastic member 100 is k, the elastic force f of the elastic member $$100 = kx \quad \text{(Equation 3)}$$

can be satisfied.

When Equation 2 and Equation 3 are substituted into Equation 1 and simplified, k=mgL/(h1h2) may be derived.

As above, when the elastic coefficient k of the elastic member 100 is set to satisfy k=mgL/(h1h2), weight compensation with regard to the link 200 is possible.

Hereinafter, a weight compensation mechanism capable of offsetting a load of a robot arm using an elastic member having a proper elastic coefficient will be described.

Figure 2:
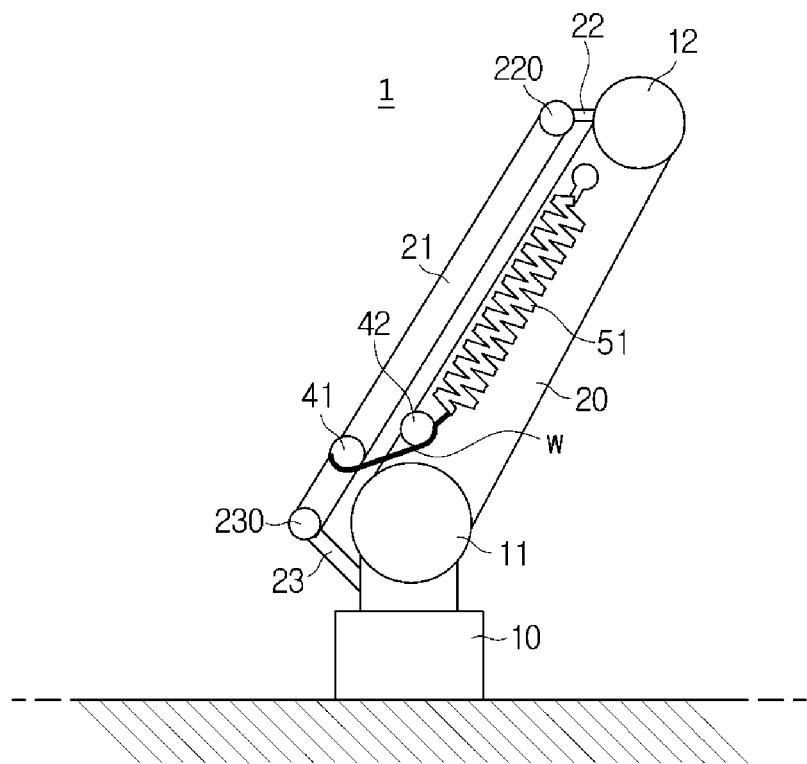
FIG. 2 is a view illustrating a robot arm according to an embodiment.

FIG. 2 is a view illustrating a robot arm according to an embodiment.

Referring to FIG. 2, a robot arm 1 according to an embodiment may include a plurality of links which are pivotably connected. The robot arm 1 may include a base 10, and a first link 20 which is pivotably connected to the base 10. One end portion of the first link 20 may be connected to the base 10 through a first joint 11. Another link may be further connected to the other end portion of the first link 20, or a load may be directly applied to the other end portion of the first link 20. The first link 20 may be pivoted with respect to the first joint 11 by a driving source (not shown).

The robot arm 1 may include a weight compensation mechanism capable of offsetting a load of the first link 20. The torque at the first joint 11 caused by the load of the first link 20 may be offset by the weight compensation mechanism included in the robot arm 1. As the torque at the first joint 11 caused by the load of the first link 20 is offset, specifications of the driving source for driving the first link 20 may be minimized.

The weight compensation mechanism with regard to the first link 20 includes a first auxiliary link 21, a second auxiliary link 22 connecting the first auxiliary link 21 to the first link 20, a plurality of pulleys 41 and 42, a wire w connecting the plurality of pulleys 41 and 42, and an elastic member 51.

The first auxiliary link 21 may be disposed parallel to the first link 20. The first auxiliary link 21 may remain parallel to the first link 20 even if the first link 20 is pivoted with respect to the first joint 11.

The second auxiliary link 22 may connect the first link 20 to the first auxiliary link 21 at the other end portion side of the first link 20. The second auxiliary link 22 may be disposed parallel to a reference surface G on which the base 10 is disposed. The second auxiliary link 22 may remain parallel to the reference surface G even if the first link 20 is pivoted with respect to the first joint 11. The other end portion of the first auxiliary link 21 and the second auxiliary link 22 may be pivotably provided with respect to a first rotary shaft 220. The second auxiliary link 22 and the other end portion of the first link 20 may be pivotably provided with respect to a second joint 12.

The first auxiliary link 21 may be connected to the first joint 11 by a third auxiliary link 23. The third auxiliary link 23 may be pivotably disposed with respect to the first joint 11. The third auxiliary link 23 may be connected to another joint portion disposed at the base 10 instead of being connected to the first joint 11. The first auxiliary link 21 and the third auxiliary link 23 may be pivotably provided with respect to a second rotary shaft 230.

The plurality of pulleys 41 and 42 may be mounted on the first link 20 and the first auxiliary link 21. In one example, the plurality of pulleys 41 and 42 may include a first pulley 41 mounted on the first auxiliary link 21 and a second pulley 42 mounted on the first link 20. The first pulley 41 may be fixed to one side of the first auxiliary link 21, and the second pulley 42 may be disposed a predetermined interval apart from a center line C which extends in the longitudinal direction of the first link 20. The first pulley 41 and the second pulley 42 may be disposed to have the same diameter r.

One side of the elastic member 51 may be fixed to the first link 20. The other side of the elastic member 51 may be connected to the wire w. The wire w may pass along the second pulley 42 and be fixed to the first pulley 41.

The load of the first link 20 may be offset by the weight compensation mechanism which includes the plurality of pulleys 41 and 42, the elastic member 51, and the wire w. In addition, since the elastic member 51 is disposed in the first link 20, the size of the robot arm 1 may be prevented from becoming unnecessarily large due to the weight compensation mechanism.

The weight compensation mechanism according to an embodiment is able to offset the load of the first link 20 through the elastic member 51 having a proper elastic coefficient regardless of the diameter of the plurality of pulleys. Hereinafter, a fact that offsetting the load of the first link 20 in the weight compensation mechanism according to an embodiment is irrelevant to the diameter of the plurality of pulleys, and setting the elastic coefficient of the elastic member 51 to offset the load of the first link 20 will be described.

Figure 3:
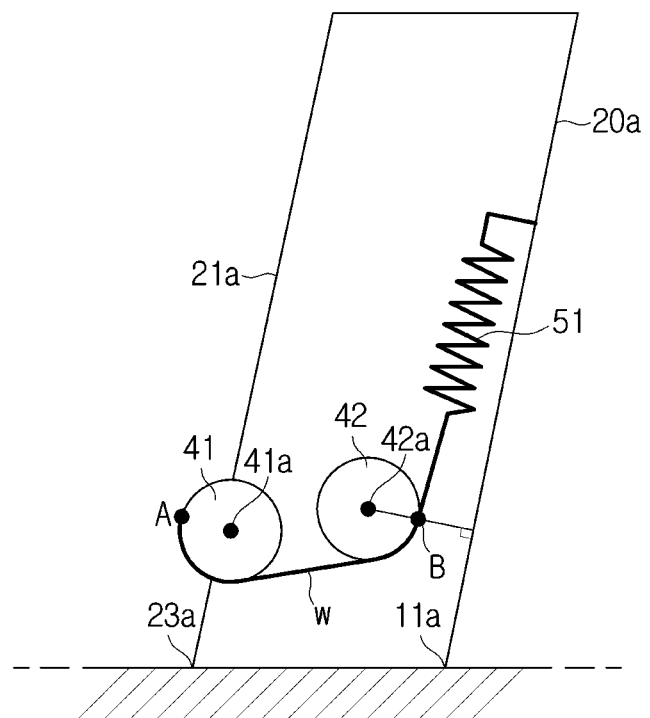
FIG. 3 is a schematic view illustrating a weight compensation mechanism of the robot arm according to an embodiment.

FIG. 3 is a schematic view illustrating a weight compensation mechanism of a robot arm according to an embodiment.

Referring to FIG. 3, a mechanism of the robot arm 1 is simplified and shown for describing a weight compensation mechanism according to an embodiment. A reference numeral 20a represents a straight line passing through the center of the first link 20 along a direction in which the first link 20 extends. A reference numeral 21a represents a straight line passing through the center of the first auxiliary link 21 along a direction in which the first auxiliary link 21 extends. A reference numeral 22a represents a straight line passing through the center of the second auxiliary link 22 along a direction in which the second auxiliary link 22 extends.

The center 41a of the first pulley 41 fixed to the first auxiliary link 21 may be disposed on the center line 21a of the first auxiliary link 21. The center 42a of the second pulley 42 may be disposed a predetermined interval h2 apart from the center line 21a of the first auxiliary link 21. The first pulley 41 and the second pulley 42 may be disposed to have the same diameter r. The interval h2 between the center 42a of the second pulley 42 and the center line 21a of the first auxiliary link 21 may be viewed as corresponding to the distance h2 between point a and point b in FIG. 1.

One end portion of the wire w may be fixed to a point A of the first pulley 41. The wire w may be wound along a portion of an outer circumferential surface of the first pulley 41 and pass along the second pulley 42, and the other end portion of the wire w may be connected to the elastic member 51 fixed to the first link 20. A point at which a straight line connecting the center line 20a of the first link 20 to the center 42a of the second pulley 42 in a minimum distance and an outer circumferential surface of the second pulley 42 intersect may be called "B". The minimum distance from the center 42a of the second pulley 42 to the center line 20a of the first link 20 may be called "h1". The minimum distance h1 from the center 42a of the second pulley 42 to the center line 20a of the first link 20 may correspond to the distance h1 from point b to the fixed portion c in FIG. 1.

The center line 20a of the first link 20 may be pivotably disposed with respect to a first reference point 11a, and the center line 21a of the first auxiliary link 21 may be pivotably disposed with respect to a second reference point 23a. One end portion of the center line 20a of the first link 20 and one end portion of the center line 21a of the first auxiliary link 21 may be connected by the center line 22a of the second auxiliary link 22. The distance h2 by which the first reference point 11a and the second reference point 23a are spaced apart may be the same as the length of the second auxiliary link 22. The first link 20 and the first auxiliary link 21 may remain parallel to each other even if respectively pivoted with respect to the first reference point 11a and the second reference point 23a.

Figure 4:
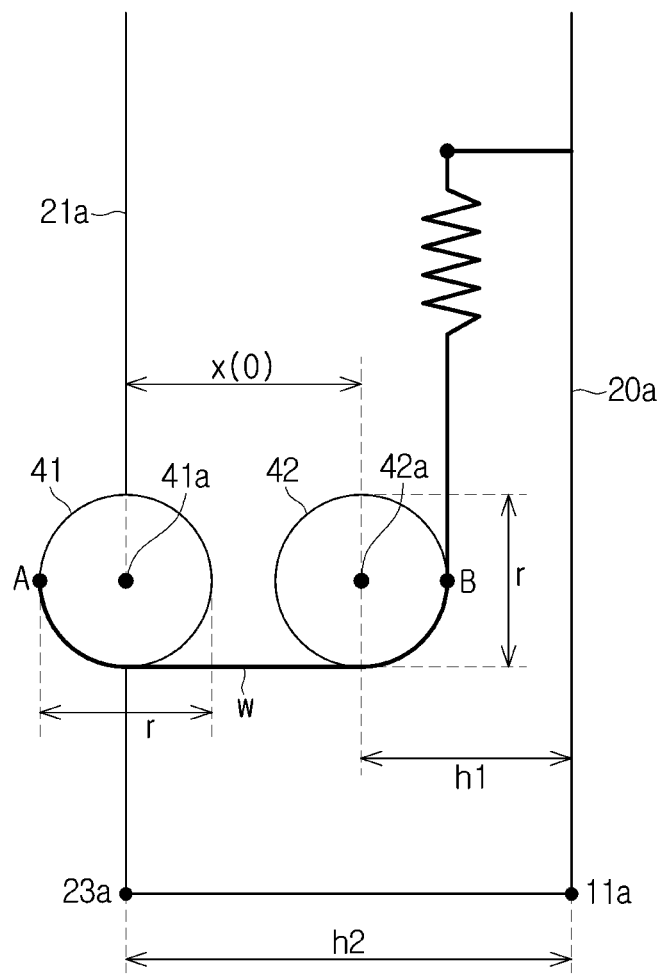
FIG. 4 is a view illustrating a state in which the robot arm according to an embodiment is at a first position.
Figure 5:
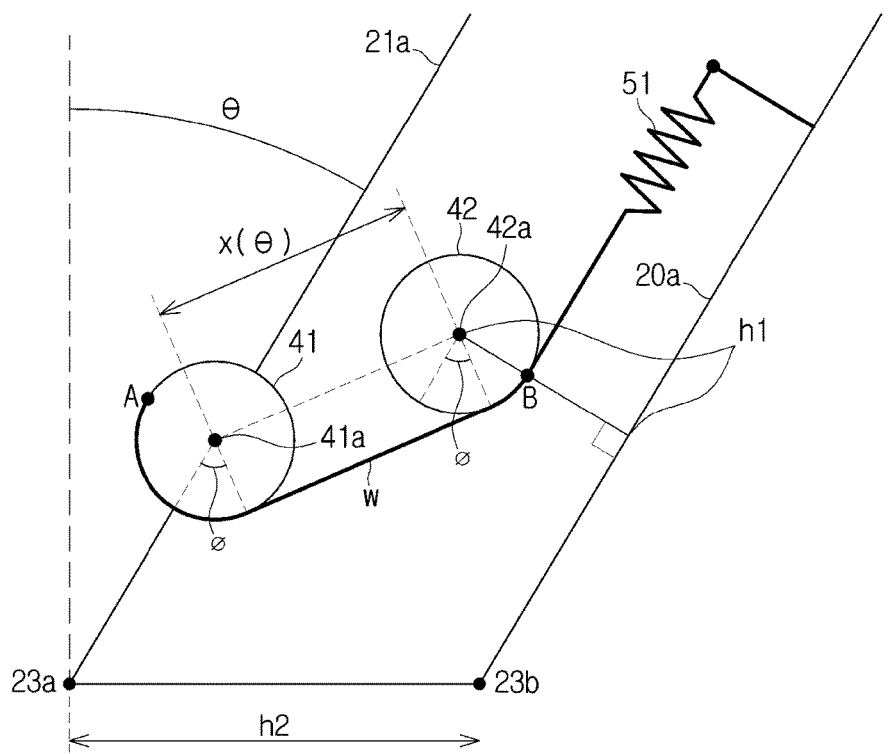
FIG. 5 is a view illustrating a state in which the robot arm according to an embodiment is at a second position.

FIG. 4 is a view illustrating a state in which the robot arm according to an embodiment is at a first position, and FIG. 5 is a view illustrating a state in which the robot arm according to an embodiment is at a second position.

Referring to FIGS. 4 and 5, the robot arm 1 according to an embodiment may be viewed as being at a first position when a reference surface is perpendicular to the first link 20. Here, the first auxiliary link 21 may be viewed as being pivotably disposed with respect to the second reference point 23a, and the first link 20 may be viewed as being pivotably disposed with respect to the first reference point 11a. The straight line connecting the center 41a of the first pulley 41 to the center 42a of the second pulley 42 is parallel to the straight line connecting the first reference point 11a to the second reference point 23a.

The wire w may be connected to the elastic member 51 and may intersect with the second pulley 42 at the point B, may pass along a partial outer circumferential surface of the second pulley 42 and a partial outer circumferential surface of the first pulley 41, and may be fixed to the point A of the first pulley 41. The center 41a of the first pulley 41 and the center 42a of the second pulley 42 may be disposed on a straight line connecting the points A and B.

When the robot arm 1 is at the first position, a distance between the center 41a of the first pulley 41 and the center 42a of the second pulley 42 may be called x(0). When a distance from the center 42a of the second pulley 42 to the center line 20a of the first link 20 is called h1, and a distance from the center 41a of the first pulley 41 to the center line 20a of the first link 20 is called h2, h2 equals h1+x(0).

As shown in FIG. 3, when the robot arm 1 is at the first position, a length WL of the wire w which extends from the point A of the first pulley 41 to the point B of the second pulley 42 may be expressed as follows.

$$WL = \frac{\pi}{2}r + h_2 - h_1 + \frac{\pi}{2}r = x(0) + \pi r \quad (1)$$

When the first link 20 rotates clockwise by θ with respect to the first reference point 11a, the first auxiliary link 21 also rotates clockwise by θ with respect to the second reference point 23a and remains parallel to the first link 20. In this state, the robot arm 1 may be viewed as being at a second position. Compared to when the robot arm 1 is at the first position, the length of the wire w wound around the first pulley 41 may be lengthened by a length of a fan-shaped arc having a central angle φ, the length of the wire w wound around the second pulley 42 may be shortened by the length of the fan-shaped arc having the central angle φ.

Consequently, when the robot arm 1 is at the second position, the length WL of the wire w which extends from the point A of the first pulley 41 to the point B of the second pulley 42 may be expressed as follows.

$$WL = \frac{\pi}{2}r + \emptyset r + x(\Theta) + \frac{\pi}{2}r - \emptyset r = x(\Theta) + \pi r \quad (2)$$

When Equation (1) is compared to Equation (2), the length WL of the wire w is expressed by a function with respect to a distance between the center 41a of the first pulley 41 and the center 42a of the second pulley 42 except a constant term πr. By this, it can be recognized that the length of the wire w is irrelevant to the diameter of the pulleys 41 and 42.

The weight compensation mechanism according to an embodiment may perform the same operation even when disposed at a certain height. Specifically, the length of the wire w always has a function related to x(θ) and is able to perform the same weight compensation function regardless of the height of the first pulley 41, the second pulley 42, and the elastic member 51 from the reference surface G.

Figure 6:
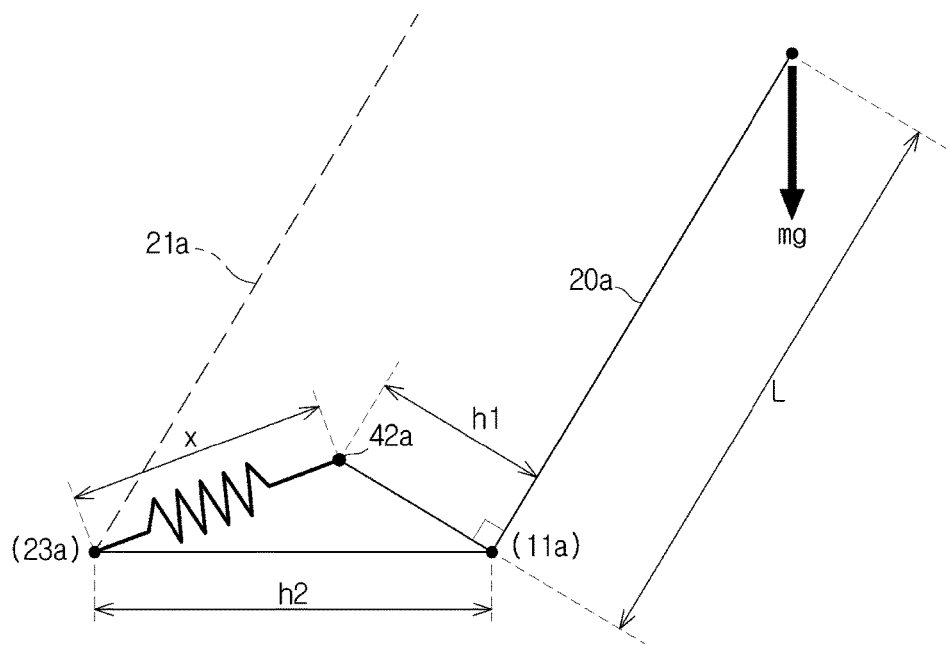
FIG. 6 is a view for describing the weight compensation mechanism according to an embodiment.
Figure 7:
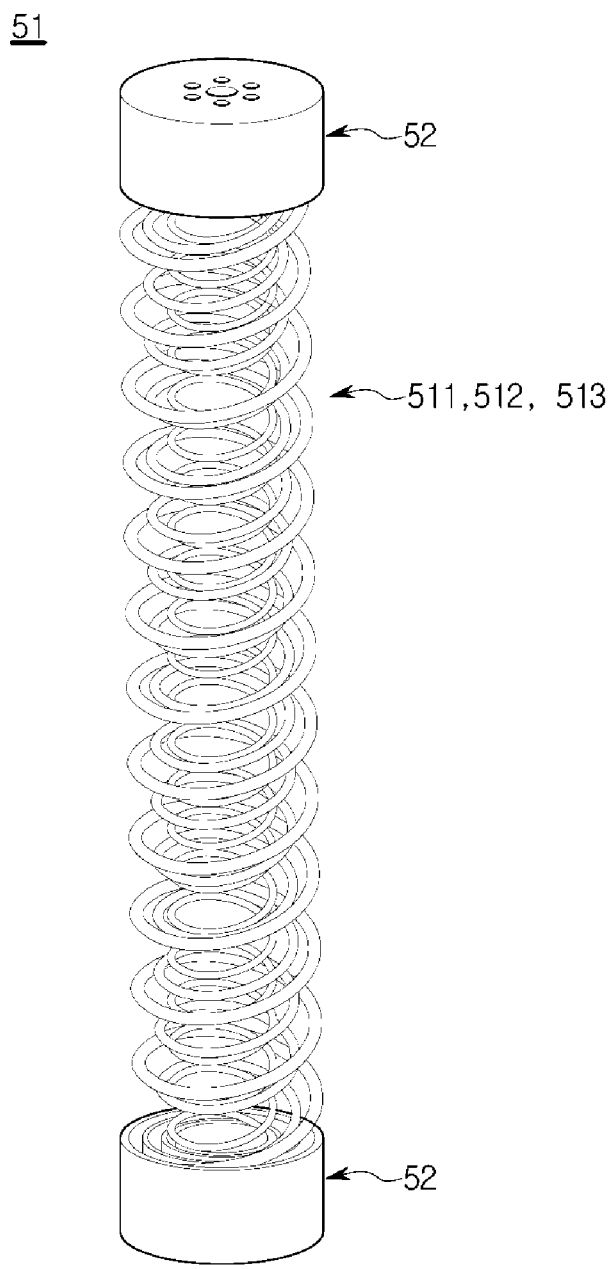
FIGS. 7 to 10 are views illustrating an elastic member according to an embodiment.
Figure 8:
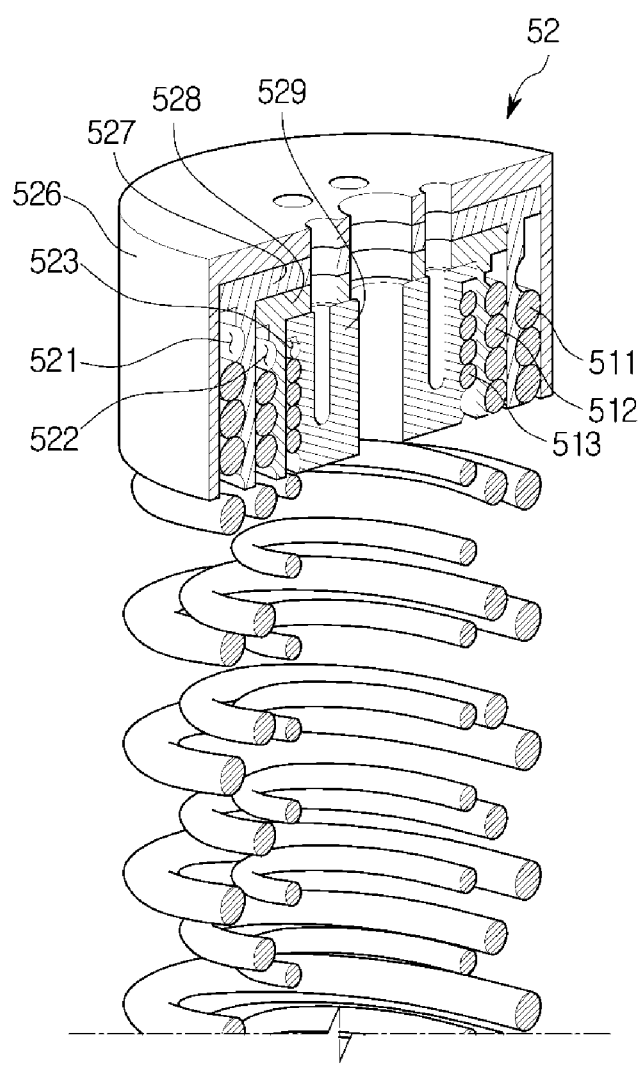
Figure 9:
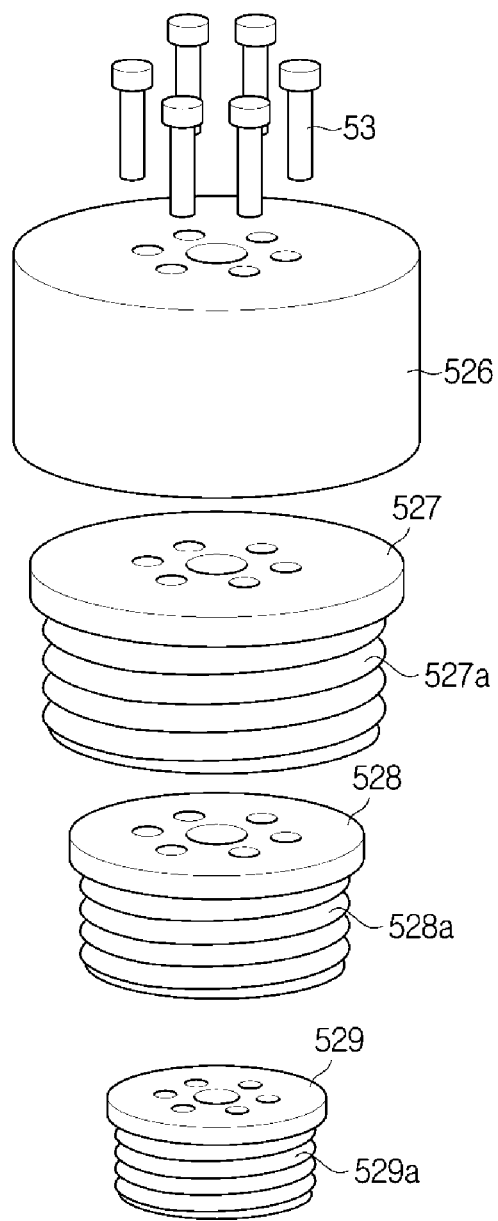
Figure 10:
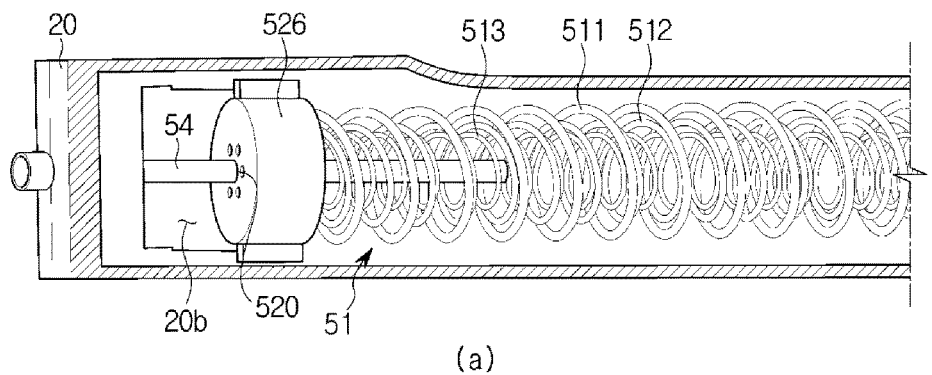
Figure 10:
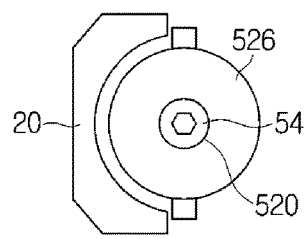

FIG. 6 is a view for describing a weight compensation mechanism according to an embodiment.

The weight compensation mechanism of the robot arm according to an embodiment may be schematized as FIG. 6. A distance between points a and b is h2, a distance between the point a and the center 42a of the second pulley is x, and a distance between the point b and the center 42a of the second pulley is h1. A straight line connecting the point b to the center 42a of the second pulley is perpendicular to the center line 20a of the first link 20. A load mg of the first link 20 may be viewed as being applied at a position which is a predetermined distance L apart from the point b.

The weight compensation mechanism shown in FIG. 6 may be viewed as being actually the same as the mechanism shown in FIG. 1. Specifically, with respect to the point b, a torque caused by the load mg of the link 20 in FIG. 6 may be viewed as being actually the same with the torque caused by the load mg of the link 200 in FIG. 1. Moreover, the distance h2 between the points a and b, the length x of the elastic member 51, and the distance h1 between the center 42a of the second pulley and the center line 20a of the first link may respectively correspond to h2, x, and h1 shown in FIG. 1.

Consequently, as the mechanism in FIG. 1 has been described, the load of the first link 20 may be offset when the elastic coefficient k of the elastic member 51 is set to satisfy k=mgL/(h1h2) as in FIG. 1 in the weight compensation mechanism in FIG. 6.

Like this, the load of the first link 20 may be offset when the elastic coefficient k of the elastic member 51 according to an embodiment is set to satisfy k=mgL/(h1h2). Since a driving source which drives the first link 20 does not have to consider a driving force for driving the first link 20 as the load of the first link 20 is offset, the driving source may be disposed in a smaller volume compared to a case in which the weight compensation mechanism is not disposed.

In the prior art case, a weight compensation mechanism was disposed outside a robot arm so as to occupy a separate volume. Consequently, the volume was increased when the weight compensation mechanism was disposed. In addition, when the weight compensation mechanism is disposed outside the robot arm, the weight compensation mechanism shown in FIG. 1 could not be applied as it is.

The elastic member 51 included in the weight compensation mechanism according to an embodiment may be disposed in the first link 20. Consequently, the weight compensation mechanism shown in FIG. 1 can be applied as it is, such that the load of the first link 20 may be offset by the elastic member 51 having a proper elastic coefficient as described in FIG. 1. In addition, since the pulleys 41 and 42, the elastic member 51, etc. included in the weight compensation mechanism according to an embodiment are not disposed outside the robot arm, the volume of the robot does not need to become larger.

In the weight compensation mechanism according to an embodiment, the load of the first link 20 may be offset by the elastic member having a proper elastic coefficient even when the diameter of the pulleys 41 and 42 becomes larger since the length of the wire w is irrelevant to the diameter of the pulleys 41 and 42 and is expressed by a function with respect to the distance between the center of the first pulley 41 and the center of the second pulley 42. Consequently, the weight compensation mechanism may be realized using the pulleys 41 and 42 with a larger diameter to stably support the first link 20.

FIGS. 7 to 10 are views illustrating an elastic member according to an embodiment.

Referring to FIGS. 7 to 10, the elastic member 51 disposed in the weight compensation mechanism according to an embodiment may be accommodated in a space 20b provided inside the first link 20. As the elastic member 51 is accommodated in the first link 20, a space occupied by the weight compensation mechanism may be reduced, and a slimmer robot arm 1 having the weight compensation mechanism may be realized. The elastic member 51 may be disposed to extend from the outside of the first link 20 along a direction in which the first link 20 extends as needed.

The elastic member 5 may be disposed by overlapping a plurality of elastic members. Realizing the elastic member 51 having a large elastic coefficient to be able to support the first link 20 with a great load may be costly or difficult. Consequently, the elastic member 51 having a large elastic coefficient may be realized by disposing an overlapping plurality of elastic members each having a small elastic coefficient.

In one example, the elastic member 51 may include a first elastic member 511, a second elastic member 512 accommodated inside the first elastic member 511, and a third elastic member 513 accommodated inside the second elastic member 512. The diameters of the first elastic member 511, the second elastic member 512, and the third elastic member 513 may be different from each other.

A cap 52 capable of fixing the elastic member 51 may be disposed at both ends of the elastic member 51. A first accommodation unit 521 in which a portion of the first elastic member 511 is inserted and fixed, a second accommodation unit 522 in which a portion of the second elastic member 512 is inserted and fixed, and a third accommodation unit 523 in which a portion of the third elastic member 513 is inserted and fixed may be disposed inside the cap 52.

The cap 52 may include a first cap 526 covering a portion of an outside of the first elastic member 511, a second cap 527 accommodated inside the first cap 526 and forming the first accommodation unit 521 with an inner surface of the first cap 526, a third cap 528 accommodated inside the second cap 527 and forming the second accommodation unit 522 with an inner surface of the second cap 527, and a fourth cap 529 accommodated inside the third cap 528 and forming the third accommodation unit 523 with an inner surface of the third cap 528.

The first elastic member 511, the second elastic member 512, and the third elastic member 513 may be respectively inserted into the first accommodation unit 521, the second accommodation unit 522, and the third accommodation unit 523 while rotating.

To enable the first elastic member 511, the second elastic member 512, and the third elastic member 513 to be respectively inserted into the first accommodation unit 521, the second accommodation unit 522, and the third accommodation unit 523 while rotating, screw threads may be formed at inner surfaces of the cap 52 forming each of the accommodation units 521, 522, and 523. Specifically, concave screw threads 527a, 528a, and 529a may be formed at outer surfaces of the second cap 527, the third cap 528, and the fourth cap 529, and the first elastic member 511, the second elastic member 512, and the third elastic member 513 may be respectively mounted thereon.

After the plurality of elastic members 51 are mounted on the cap 52, the whole cap 52 may be fastened by fastening members 53. Thereby, the plurality of elastic members 51 may be fixed.

To realize an elastic member having a required elastic coefficient, the number of elastic members is not limited to the above. In addition, the shape of the cap 52 fixing the plurality of elastic members is not limited to that mentioned above. The cap 52 fixing the first elastic member 511, the second elastic member 512, and the third elastic member 513 may be integrally formed.

An adjustment device 54 for adjusting an initial tension of the elastic member 51 may be disposed at the cap 52. The adjustment device 54 may be disposed in a shape of a shaft passing through the center of the cap 52. A central hole 520 may be formed at the center of the cap 52, and a screw thread (not shown) may be formed at an inner surface forming the central hole 520. A screw thread corresponding to the screw thread formed at the inner surface of the central hole 520 may be formed at an outer surface of the adjustment device 54. The adjustment device 54 may adjust the tension of the elastic member 51 by being inserted into the central hole 520 and rotating.

Figure 11:
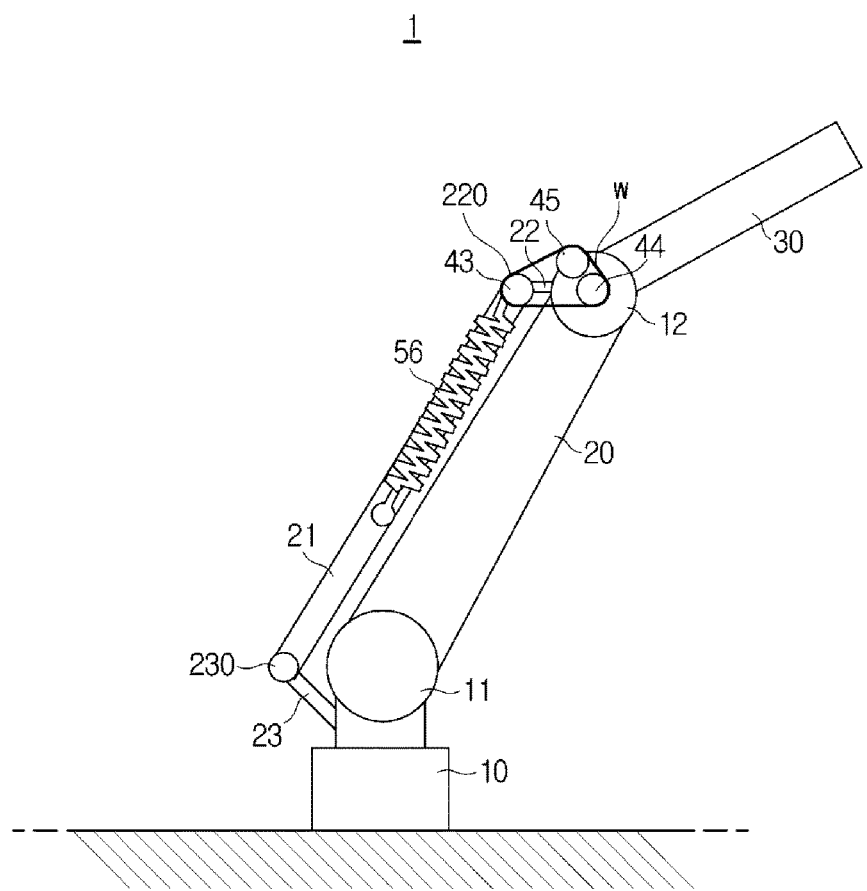
FIG. 11 is a view illustrating a robot arm according to another embodiment.

FIG. 11 is a view illustrating a robot arm according to another embodiment.

Referring to FIG. 11, a robot arm 1 according to another embodiment may be disposed by a plurality of links pivotably connected. The robot arm 1 may include the base 10, and the first link 20 which is pivotably connected to the base 10. One end portion of the first link 20 may be connected to the base 10 through the first joint 11. The first link 20 may be pivoted with respect to the first joint 11 by a driving source (not shown).

A second link 30 may be pivotably connected to the other end portion of the first link 20. The other end portion of the first link 20 and one end portion of the second link 30 may be connected through the second joint 12. A load may be directly applied to the other end portion of the second link 30. The second link 30 may be pivoted with respect to the second joint 12 by the driving source.

A weight compensation mechanism capable of offsetting a load of the second link 30 may be disposed at the robot arm 1. By the weight compensation mechanism disposed at the robot arm 1, a torque at the second joint 12 caused by the load of the second link 30 may be offset. As the torque caused by the load of the second link 30 is offset, a specification of the driving source for driving the second link 30 may be minimized.

The weight compensation mechanism with respect to the second link 30 includes the first auxiliary link 21 disposed parallel to the first link 20, an elastic member 56 fixed to the first auxiliary link 21, a first pulley 43 mounted on the first auxiliary shaft 220 connecting the first auxiliary link 21 to the second auxiliary link 22, a second pulley 44 mounted on the second joint 12, and a third pulley 45 mounted on the second link 30.

The first auxiliary link 21 may be disposed parallel to the first link 20, and may always remain parallel to the first link 20 even when the first link 20 is pivoted with respect to the first joint 11.

The first auxiliary link 21 may be connected to the other end portion side of the first link 20 by the second auxiliary link 22. The first auxiliary link 21 and the first link 20 may always remain parallel while being a predetermined interval apart. The second auxiliary link 22 may be disposed parallel to the reference surface G on which the base 10 is disposed. The other end portion of the first auxiliary link 21 and the second auxiliary link 22 may be pivotably provided with respect to the first rotary shaft 220. The second auxiliary link 22 and the other end portion side of the first link 20 may be pivotably provided with respect to the second joint 12.

Meanwhile, the first auxiliary link 21 may be connected to the first joint 11 by the third auxiliary link 23. The third auxiliary link 23 may be pivotably disposed with respect to the first joint 11.

The first pulley 43 may be mounted on the first auxiliary shaft 220 to which the first auxiliary link 21 and the second auxiliary link 22 are pivotably connected. The first pulley 43 may be mounted on a rotary shaft on which the first auxiliary link 21 and the second auxiliary link 22 are mounted.

The second pulley 44 may be mounted on the second joint 12. The third pulley 45 may be mounted on the second link 30 and move together with the second link 30. The third pulley 45 may be disposed a predetermined interval h1 apart from a center line of the second link 30.

The first pulley 43, the second pulley 44, and the third pulley 45 may be disposed to have the same diameter r.

The first pulley 43, the second pulley 44, and the third pulley 45 may be surrounded by the wire w. One end of the wire w may be fixed to a point d of the first pulley 43 after surrounding the first pulley 43, the second pulley 44, and the third pulley 45. The other end of the wire w may be connected to the elastic member 56.

One end of the elastic member 56 may be fixed to the first auxiliary link 21. The other end of the elastic member 56 may be connected to the wire w.

The load of the second link 30 may be offset by the weight compensation mechanism including the plurality of pulleys 43, 44, and 45, the elastic member 56, and the wire w. Since the weight compensation mechanism of the second link 30 is disposed at a link and joint forming the robot arm 1, the volume of the robot arm 1 may be prevented from becoming unnecessarily large due to the weight compensation mechanism.

The weight compensation mechanism according to another embodiment may offset the load of the second link 30 through the elastic member 56 having a proper elastic coefficient regardless of the diameter of the plurality of pulleys. Hereinafter, setting the elastic coefficient of the elastic member 56 for offsetting the load of the second link 30 in the weight compensation mechanism according to another embodiment will be described.

Figure 12:
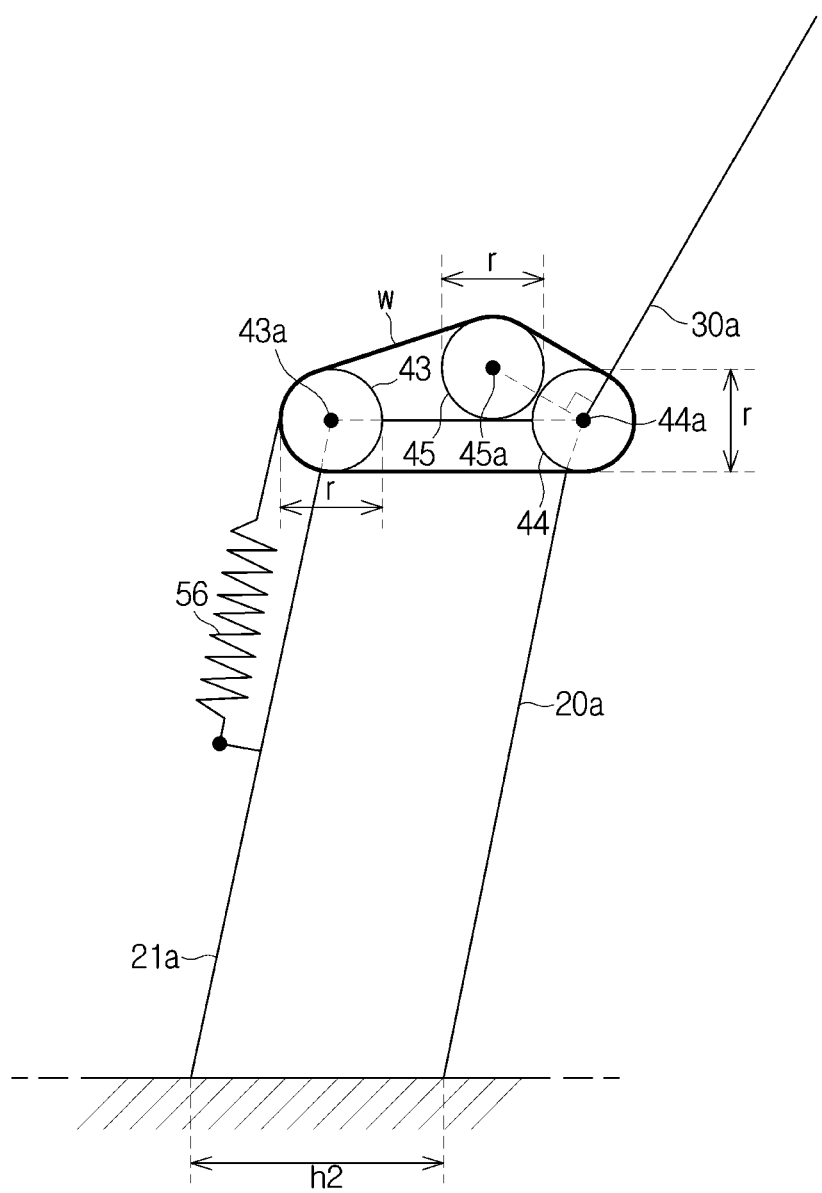
FIG. 12 is a schematic view illustrating a weight compensation mechanism of the robot arm according to another embodiment.

FIG. 12 is a schematic view illustrating a weight compensation mechanism of a robot arm according to another embodiment.

Referring to FIG. 12, a mechanism of the robot arm 1 is simplified and shown for describing the weight compensation structure according to another embodiment. The reference numeral 20a represents a straight line passing through the center of the first link 20 along a direction in which the first link 20 extends. A reference numeral 30a represents a straight line passing through the center of the second link 30 along a direction in which the second link 30 extends. The reference numeral 21a represents a straight line passing through the center of the first auxiliary link 21 along a direction in which the first auxiliary link 21 extends. The reference numeral 22a represents a straight line passing through the center of the second auxiliary link 22 along a direction in which the second auxiliary link 22 extends.

The distance between the center line 21a of the first auxiliary link and the center line 20a of the first link is called h2. A distance between a center 44a of the second pulley 44 and a center 45a of the third pulley 45 may be called h1. As the second link 30 is pivoted with respect to the second joint 12, a distance between a center 43a of the first pulley 43 and the center 44a of the second pulley 44 may vary.

The wire w may have one end portion fixed to a point d of the first pulley 43, and surround the first pulley 43, the second pulley 44, and the third pulley 45. The other end portion of the wire w may be connected to the elastic member 56. A point at which the elastic member 56 and the first pulley 43 intersect may be called e.

A straight line connecting the center 44a of the second pulley 44 and the center 45a of the third pulley 45 may form a right angle with the center line 30a of the second link.

Figure 13:
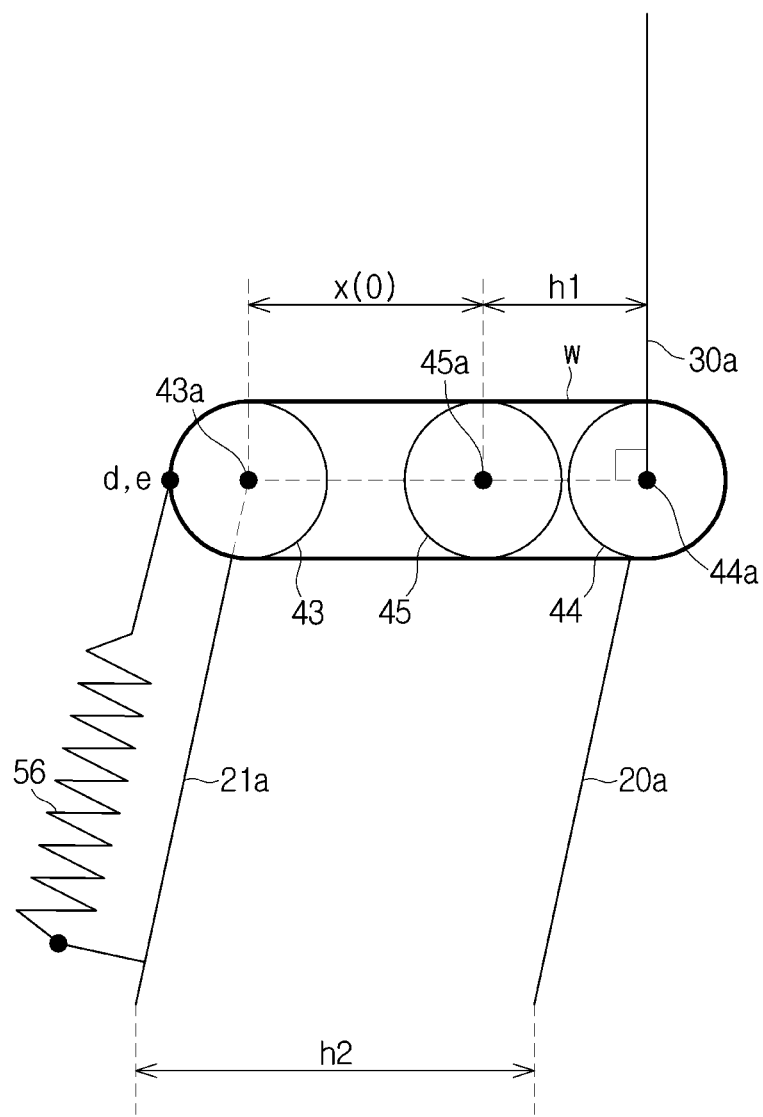
FIG. 13 is a view illustrating a state in which the robot arm according to another embodiment is at a first position.
Figure 14:
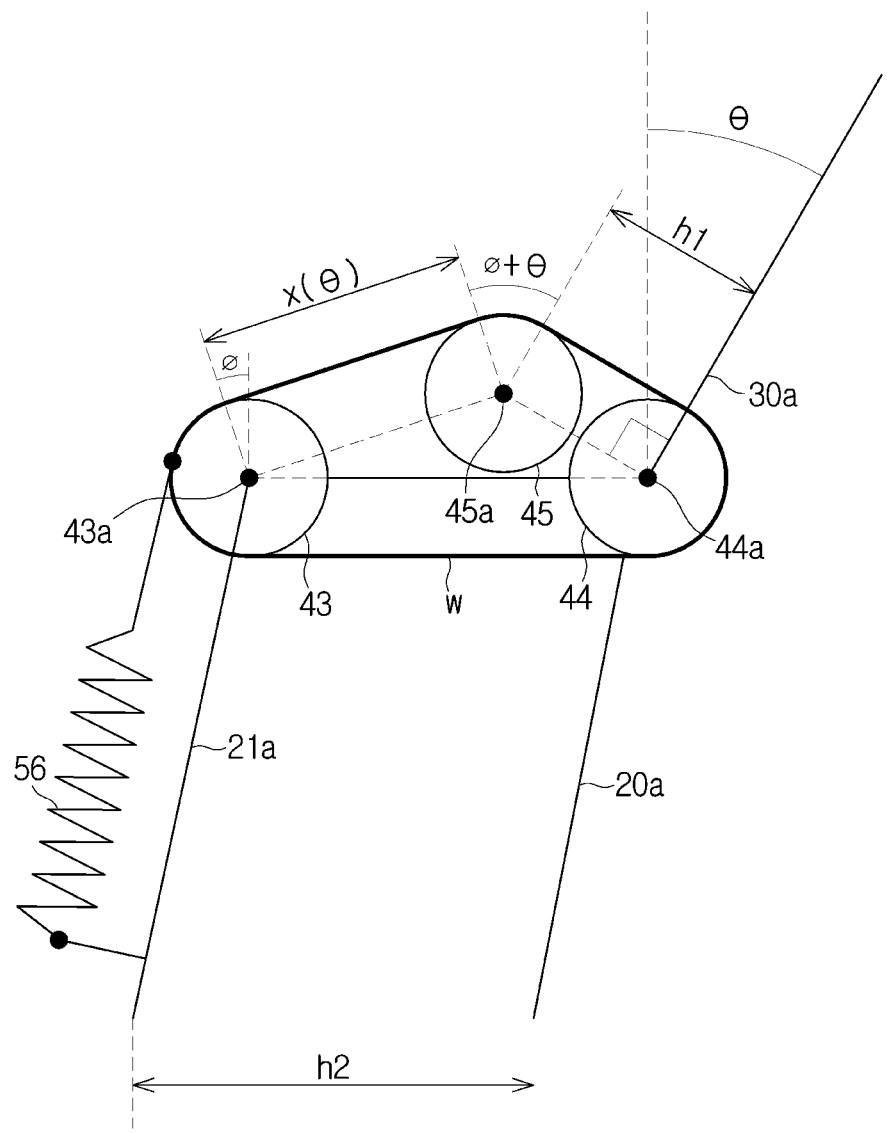
FIG. 14 is a view illustrating a state in which the robot arm according to another embodiment is at a second position.

FIG. 13 is a view illustrating a state in which the robot arm according to another embodiment is at a first position, and FIG. 14 is a view illustrating a state in which the robot arm according to another embodiment is at a second position.

Referring to FIGS. 13 and 14, the robot arm 1 according to another embodiment may be viewed as being at a first position when the center 43a of the first pulley 43, the center 44a of the second pulley 44, and the center 45a of the third pulley 45 are disposed on a straight line, and the center line 30a of the second link is perpendicular to a straight line connecting the center 43a of the first pulley 43, the center 44a of the second pulley 44, and the center 45a of the third pulley 45.

As shown in FIG. 13, at the first position, a distance between the center 43a of the first pulley 43 and the center 45a of the third pulley 45 may be called x(0). Here, a distance WL between the point d at which the wire w is fixed to the first pulley 43 and the point e at which the elastic member 56 and the first pulley intersect is as follows.

$$WL = 2h_2 + \pi r = x(0) + h_1 + h_2 + 2\pi r \quad \text{(Equation 1)}$$

As shown in FIG. 14, if the robot arm 1 is viewed as being at the second position when the second link 30 has rotated by a predetermined angle θ with respect to the second joint 12 at the first position, a distance between the center 43a of the first pulley 43 and the center 45a of the third pulley 45 at the second position may be called x(θ). As the second link 30 rotates with respect to the second joint 12, the third pulley 45 may rotate clockwise with respect to the second pulley 44, and the center 43a of the first pulley 43, the center 44a of the second pulley 44, and the center 45a of the third pulley 45 may be disposed at each vertex of a triangular shape.

Here, the distance WL between point d at which the wire w is fixed to the first pulley 43 and point e at which the elastic member 56 and the first pulley 43 intersect is as follows.

$$WL = (\pi r - \phi r) + x(\Theta) + (\phi - \Theta)r + h_1 + (\pi r - \Theta r) + h_2 \quad \text{(Equation 2)}$$
$$= x(\Theta) + h_1 + h_2 + 2\pi r$$

When Equation 1 is compared to Equation 2, it can be recognized that the length of the wire is expressed by a function of $x(\theta)$, which is a distance between the first pulley 43 and the third pulley 45, except a constant term $h1+h2+\pi r$. By this, it can be recognized that the length of the wire w is irrelevant to the diameter of the pulleys 43, 44, and 45.

Figure 15:
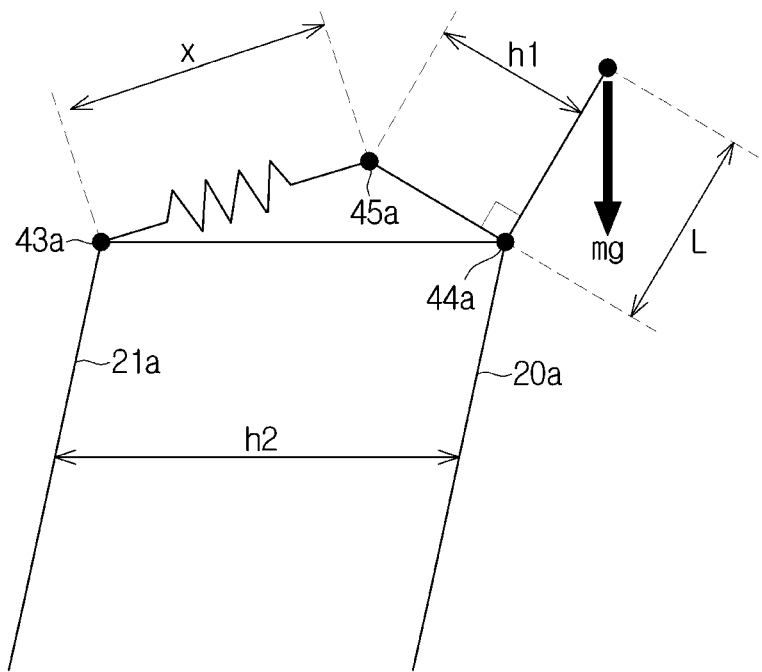
FIG. 15 is a view for describing a weight compensation mechanism of the robot arm according to another embodiment.

FIG. 15 is a view for describing a weight compensation mechanism of a robot arm according to another embodiment.

The weight compensation mechanism of the robot arm 1 according to another embodiment may be schematized as FIG. 15. A distance between the center 43a of the first pulley 43 and the center 44a of the second pulley 44 is h2, a distance between the center 44a of the second pulley 44 and the center 45a of the third pulley 45 is h1, and a distance between the center 43a of the first pulley 43 and the center 45a of the third pulley 45 is x.

The load mg of the second link 30 may be viewed as being applied at a portion which is a predetermined distance L apart from the center 44a of the second pulley 44.

The weight compensation mechanism shown in FIG. 15 may be viewed as being actually the same as the mechanism shown in FIG. 1. Specifically, the distance h2 between the center 43a of the first pulley and the center 44a of the second pulley may be viewed as corresponding to h2 in FIG. 1, the distance h1 between the center 44a of the second pulley and the center 45a of the third pulley may be viewed as corresponding to h1 in FIG. 1, and the distance x between the center 43a of the first pulley and the center 45a of the third pulley may be viewed as corresponding to x in FIG. 1.

In addition, with respect to the center 44a of the second pulley, a torque caused by the load mg of the second link 30 in FIG. 15 may be viewed as being actually the same as the torque caused by the load mg of the link 200 in FIG. 1.

Consequently, as the mechanism in FIG. 1 has been described, the load of the first link 20 may be offset in the weight compensation mechanism in FIG. 15 when the elastic coefficient k of the elastic member 56 is set to satisfy k=mgL/(h1h2) as in FIG. 1.

Like this, the load of the second link 30 may be offset when the elastic coefficient k of the elastic member 56 is set to satisfy k=mgL/(h1h2). As the load of the second link 30 is offset, the driving source which drives the second link 30 does not have to consider a driving force for driving the second link 30 and may be disposed in a smaller volume compared to when the weight compensation mechanism is not disposed.

In the prior art case, a weight compensation mechanism was disposed outside a robot arm to occupy a separate volume. Consequently, the volume was increased when the weight compensation mechanism was disposed. In addition, when the weight compensation mechanism is disposed outside the robot arm, the weight compensation mechanism shown in FIG. 1 could not be applied as it is.

The elastic member 56, and the pulleys 43, 44, and 45, etc. included in the weight compensation mechanism according to another embodiment may be disposed inside components of the robot arm 1, i.e. a joint portion in the second link 30, the first auxiliary link 21, and the robot arm 1. Consequently, the weight compensation mechanism shown in FIG. 1 may be applied as it is, such that the load of the first link 20 may be offset by the elastic member 56 having a proper elastic coefficient as described in FIG. 1. In addition, since the pulleys 43, 44, and 45, the elastic member 56, etc. included in the weight compensation mechanism according to another embodiment is not disposed outside the robot arm, the volume of the robot may not become larger.

In the weight compensation mechanism according to another embodiment, the load of the second link 30 may be offset by the elastic member having a proper elastic coefficient even when the diameter of the pulleys 43, 44, and 45 become longer, since the length of the wire w is irrelevant to the diameter of the pulleys 43, 44, and 45 and is expressed by a function with respect to the distance between the center of the first pulley 43 and the center of the third pulley 45. Consequently, the weight compensation mechanism may be realized using the pulleys 43, 44, and 45 with a large diameter to stably support the second link 30.

Figure 16A:
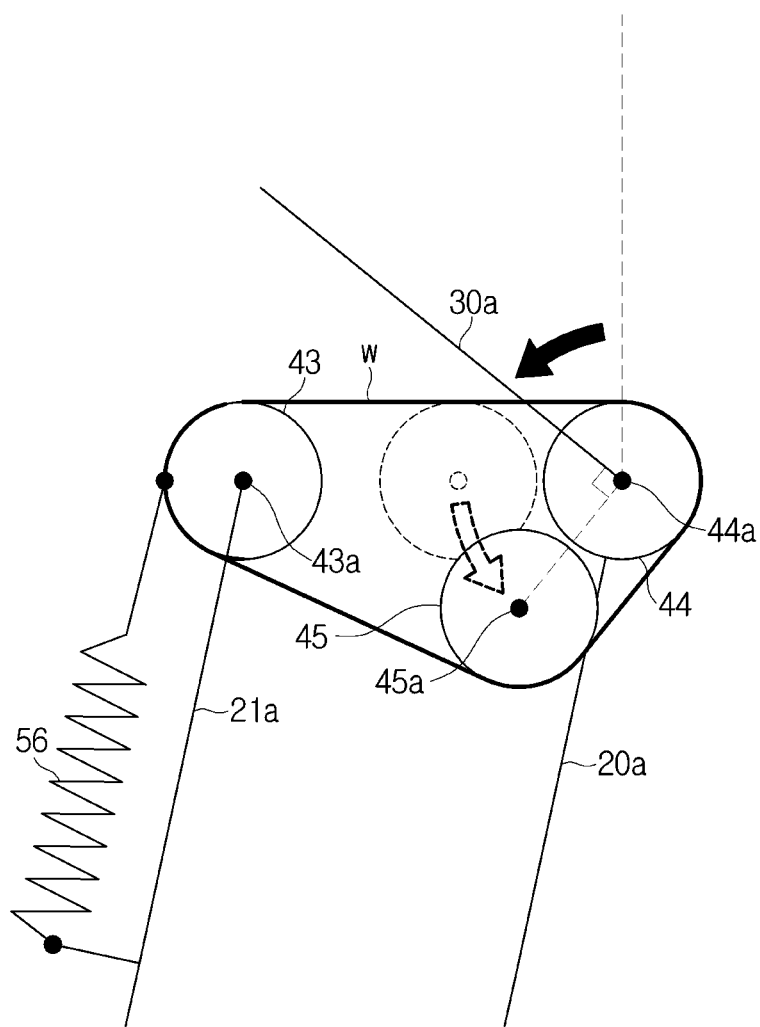
FIGS. 16a to 16c are views for describing a moving angle of the robot arm according to another embodiment.
Figure 16B:
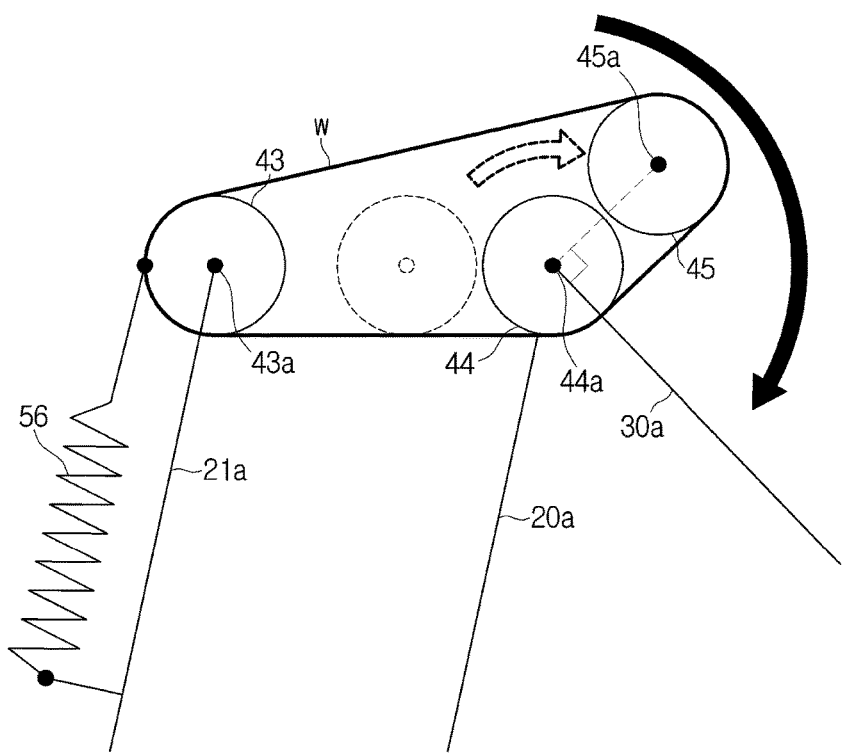
Figure 16C:
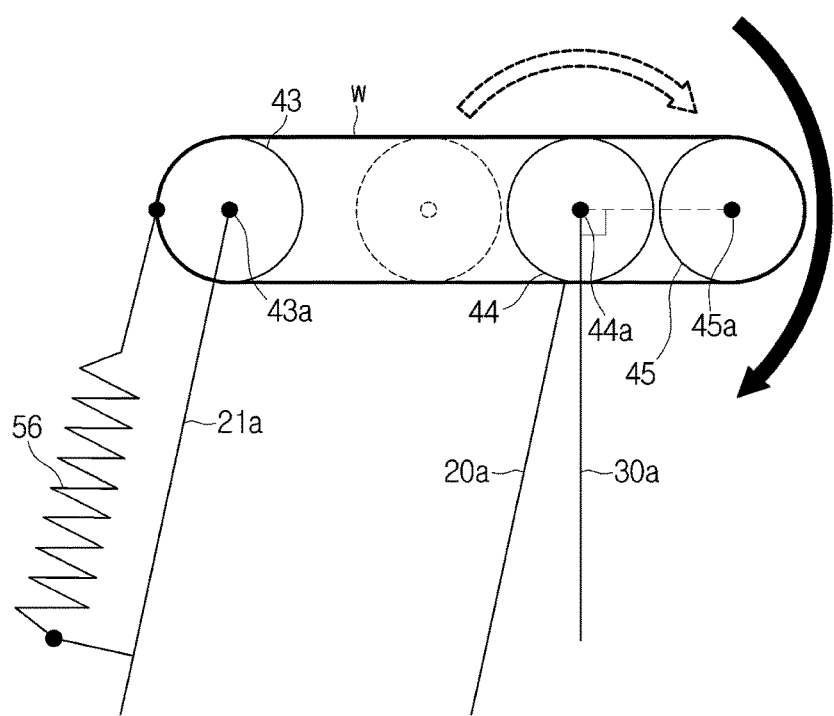

FIGS. 16A to 16C are views for describing a moving angle of a robot arm according to another embodiment.

Referring to FIGS. 16A to 16C, the second link 30 according to an embodiment may secure a wide moving angle. When the mechanism of the first auxiliary link 21, the second auxiliary link 22, and the second link 30 is properly designed, the second link 30 may have a moving angle of approximately 360°.

Content related to the elastic member shown in FIGS. 7 to 10 may be similarly applied to a configuration of the elastic member 56 in another embodiment shown in FIGS. 11 to 16c.

According to a disclosed embodiment, a load of a link included in a robot arm may be offset by a weight compensation mechanism, thereby reducing a size of a driving source and realizing a slim robot.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A robot arm comprising:
   a first link of the robot arm, the first link pivotably disposed;
   a first auxiliary link of the robot arm disposed parallel to the first link;
   a first pulley mounted on the first auxiliary link;
   a second pulley mounted on the first link;
   a wire connecting the first pulley to the second pulley; and
   an elastic member having one side mounted on the first link and another side connected to the wire to provide an elastic force to compensate for a load of the first link,
   wherein the wire has:
      one end portion thereof fixed to the first pulley, and
      another end portion thereof configured to pass along a portion of an outer surface of the second pulley and connected to the elastic member.

2. The robot arm according to claim 1, wherein, the first auxiliary link remains parallel to the first link when the first link is pivoted.

3. The robot arm according to claim 1, wherein a diameter of the first pulley is equal to a diameter of the second pulley.

4. The robot arm according to claim 1, wherein a distance between the first pulley and the second pulley varies as the first link is pivoted.

5. The robot arm according to claim 1, wherein a center of the second pulley is positioned at an interval apart from a center line passing through a center of the first link and extending along a direction in which the first link longitudinally extends.

6. The robot arm according to claim 1, wherein the elastic member is accommodated in an inner space of the first link.

7. The robot arm according to claim 1, wherein a center of the first pulley is positioned on a center line extending along a direction in which the first auxiliary link extends and passing through a center of the first auxiliary link.

8. The robot arm according to claim 1, further comprising a second auxiliary link connecting the first link to the first auxiliary link.

9. The robot arm according to claim 8, wherein the first link and the first auxiliary link are spaced apart from each other by as much as a length of the second auxiliary link and remain parallel to each other even when the first link is pivoted.

10. The robot arm according to claim 8, wherein the second auxiliary link is pivotably disposed with respect to respective axes of rotations of the first link and the first auxiliary link.

11. The robot arm according to claim 1, wherein the elastic member comprises a plurality of overlapping elastic members.

12. The robot arm according to claim 11, further comprising a cap mounted on end portions of the plurality of elastic members to fix the plurality of elastic members.

13. The robot arm according to claim 12, wherein screw threads are formed in an interior of the cap, and
each of the plurality of elastic members are fixed by one of the screw threads.

14. The robot arm according to claim 12, wherein
a plurality of accommodation units into which the plurality of elastic members are insertable are formed at the cap, and
a number of the accommodation units corresponds to a number of the plurality of elastic members.

15. The robot arm according to claim 14, wherein
the accommodation units are formed at inner surfaces of the cap, and
each of the inner surfaces of the cap forming the accommodation units has a screw thread capable of fixing one of the elastic member.

16. The robot arm according to claim 12, further comprising an adjustment device to adjust tension of the elastic member, the adjustment device being disposed at the cap.

17. The robot arm according to claim 16, wherein the adjustment device is a shaft having a screw thread formed at an outer circumferential surface thereof and configured to pass through the cap.

18. The robot arm according to claim 17, wherein a tension of the elastic member is adjustable by rotating the shaft.

19. A robot arm comprising:
a first link of the robot arm;
a second link of the robot arm configured to remain parallel to the first link when the first link pivots; and
a weight compensation mechanism to compensate for a load of the first link by an elastic force, comprising:
a first pulley mounted on the first link,
a second pulley having a same diameter as that of the first pulley and mounted on the second link,
a wire connecting the first pulley to the second pulley, and
an elastic member disposed along a direction in which the first link longitudinally extends, configured to provide the elastic force to compensate for the load, and having one side fixed to the first link and another side connected to the wire,
wherein the wire has:
one end portion thereof fixed to the first pulley, and
another end portion thereof configured to pass along a portion of an outer surface of the second pulley and connected to the elastic member.

20. A robot arm comprising:
a first link of the robot arm, the first link pivotable about a joint;
a pivotable first auxiliary link of the robot arm disposed parallel to the first link, such that when the first link pivots about the joint along a pivot path, the first auxiliary link remains parallel to the first link and an interval between the first auxiliary link and the first link decreases;
a first pulley mounted on the first auxiliary link;
a second pulley mounted on the first link, such that a distance between the first pulley and the second pulley increases when the first link pivots along the pivot path;
an elastic member having a first side mounted on the first link; and
a wire having a first end portion fixed to the first pulley, a second end portion attached to a second side of the elastic member, and a section taut against the second pulley, such that the elastic member provides an elastic force biasing the first and second pulleys toward each other to compensate against a load of the first link tending to pivot the first link along the pivot path.

21. The robot arm according to claim 20, wherein the elastic member extends in a direction in which the first link longitudinally extends, and is disposed on the first link or in an interior space of the first link.

* * * * *